Patented June 16, 1953

2,642,514

UNITED STATES PATENT OFFICE 2,642,514

ION EXCHANGE PROCESS WITH MAGNETIC ION EXCHANGE RESINS

Earl C. Herkenhoff, Stamford, Conn., assignor to American Cyanamid Company, New York, N. Y., a corporation of Maine No Drawing. Application August 10, 1946, Serial No. 689,811

3 Claims. (Cl. 210—24)

This invention relates to ion exchange resins and more particularly, to magnetic or magnetized ion exchange resins which are amenable to separation from non-magnetic ion exchange resins in admixture therewith by magnetic means.

Many advantages are attained upon use of intimately mixed ion exchange resins in place of the more conventional set-up of separate beds in liquid demineralization processes. For example, mixed resins often give more efficient and more complete demineralization. Moreover, they permit the use of conventional types of equipment for liquid demineralization and do not require special equipment. When mixed resins are used in disposable cartridges many advantages are apparent. These include reduction in packing labor, increase in packing machine capacity, elimination of the necessity for separator screens between multiple beds, increased quantity of water per unit volume of exchange material, lack of high acidity in the liquid to be demineralized due to immediate neutralization, etc. Mixed resins are also useful in commercial installations either in the form of beds or as filter coatings, either in batch processes or in continuous processes.

One outstanding disadvantage in the use of mixed resins lies in the excessive waste of material heretofore necessarily inherent in the process. The ion exchange resins are too expensive for practicable discarding after only one cycle of demineralization and usually must be regenerated and then reused. The separation of a specific type of ion exchange resin from mixtures with other types of resins for regeneration or other purposes has in the past presented a difficult problem.

Separation of mixtures of ion exchange resins and subsequent reuse of the resins after suitable regeneration is proposed by Alexander V. Alm in his copending application, Serial No. 689,807 filed August 10, 1946, now abandoned. The Alm application describes in detail methods of separation including particularly froth flotation processes.

Separation of one ion exchange resin from another in admixture therewith by "sink and float" methods using a heavy gravity medium, and particularly, using muds or suspensoids of finely ground solid materials as the heavy gravity medium, has also been proposed.

It is an object of the present invention to effect separation of mixed ion exchange resins, one from the other, by means of magnetic separation.

A further object of the present invention is, therefore, the preparation of magnetic ion exchange resins which are amenable to magnetic separation from non-magnetic ion exchange resins.

Another object of the present invention is to provide a process for preparing magnetic ion exchange resins.

Still another object of the present invention is to provide a process for demineralization of a liquid which includes bringing the liquid into contact with a mixture of cation and anion exchange resins, at least one of which is magnetically-recoverable from the others, separating the mixture of resins from the demineralized liquid by filtration, decantation, froth flotation or any other suitable means, and further separating the magnetic ion exchange resin from the other resin or resins by means of magnetic separation.

These and other objects are attained by incorporating particles of a magnetic substance with an ion exchange resin either during or after its preparation, using the resulting magnetic ion exchange resin as a component of a mixture of ion exchange resins, bringing a liquid containing ionizable solids into contact with the mixture of ion exchange resins which includes the magnetic resin, separating the demineralized liquid from the mixture of resins, and removing the magnetic resin from the other resin or resins of the mixture by means of magnetic separation. The different type resins are regenerated separately, then remixed and reused to remove ionizable solids from liquids containing same.

The invention will be described in greater detail in conjunction with the following specific examples in which the proportions are given in parts by weight. The examples are merely illustrative and it is not intended that the scope of the invention should be limited to the details thereof.

Example 1

A cylinder or other similar vessel is filled with a mixture of activated, granular, cation active material, and activated, granular, anion active material, one of which ion active materials has been made magnetic in accordance with the present invention.

A liquid containing ionizable solids is passed through the bed of mixed resin in the cylinder or other vessel, and a neutral salt-free effluent is obtained therefrom. When the capacity of the resin mixture for removal of cations and anions from the liquid is exhausted, the liquid supply to the bed of mixed resin is shut off and the mixture of resins is removed from the vessel.

The magnetic ion active material is then separated from the non-magnetic ion active material by means of a magnet or other magnetic separator. The anion active resin so separated from the resin mixture is regenerated by treatment with an alkali and the cation active resin, by treatment with acid. The regenerated resins are then remixed and the mixture is reused for further liquid demineralization.

Example 2

| | Parts |
|---|---|
| Phenol (1 mol) | 94 |
| Anhydrous sodium bisulfite (0.25 mol) | 26 |
| Anhydrous sodium sulfite (0.25 mol) | 31.5 |
| 37% formalin (2.5 mols) | 202.5 |
| —325 mesh magnetite (15% by weight of the final cured resin) | 34 |

All of the above ingredients except the magnetite are charged into a suitable vessel equipped with means for agitation, a reflux condenser and a thermometer. An exothermic reaction takes place and the temperature of the batch rises to refluxing which occurs at about 100° C. Refluxing is continued until a viscous syrup is obtained, i. e., about 2 hours.

The magnetite is then added to the resin syrup and the mixture agitated for about 5 minutes. The viscous syrup containing the finely divided magnetite in suspension is then cured for 16 hours at 100° C. and for 16 hours at 150° C.

The cured resin is ground, screened and the 24–30 mesh particles found to have a capacity for the removal of cations from solution of 15 kilograins as calcium carbonate per cubic foot of resin.

The resin is readily attracted by a magnet both initially and after it has been subjected to a number of liquid demineralization cycles.

Example 3

Example 2 is repeated with about 23 parts of magnetite, 10% by weight of the final cured resin, instead of 34 parts. The resin obtained is attracted to a magnet.

Example 4

Example 2 is repeated using a —325 mesh ferrosilicon which contains 15% silicon in place of the magnetite. A resin having a capacity for the removal of cations from solution and the property of being attracted by a magnet is obtained.

Example 5

Example 2 is repeated using an extremely finely-divided magnetic iron oxide obtained as a by-product in the production of aniline by reduction of nitrobenzene in the presence of iron instead of the magnetite. The product obtained has satisfactory magnetic properties which make it susceptible to separation from non-magnetic material by means of a magnet, and it has a capacity for the removal of cations from solution.

Example 6

10 parts of anion active resin "A", prepared as described in detail below, are placed in a suitable container and activated by treatment with a dilute solution of sodium carbonate. An equal quantity of the magnetic product of Example 2 is activated by passing a dilute hydrochloric acid solution through a bed of the resin. The activated cation and anion exchange resins are then mixed together, and the mixture is used for the demineralization of liquids as described in Example 1.

Example 7

| | Parts |
|---|---|
| Anion active resin prepared according to the process described in U. S. Patent No. 2,285,750 | 210 |
| —325 mesh magnetite | 40 |
| 40° Bé. sodium silicate | 60 |
| Water | 30 |

The magnetite, sodium silicate, and water are mixed together to form a slurry and the granulated resin is then added to the mixture. After thorough mixing in order to distribute the magnetite and the sodium silicate evenly over the resin particles, the product is dried at 110° C.

The dried product has a capacity for the removal of anions from solution and is attracted by a magnet.

Example 8

10 parts of a cation active resin prepared according to the process of Example 5 of U. S. Patent No. 2,372,233, are activated by treatment with a dilute hydrochloric acid solution. An equal quantity of the magnetic product of Example 7 is activated by passing a dilute solution of sodium carbonate through a bed of the resin. The activated cation and anion exchange resins are then mixed together, and the mixture is used for the demineralization of liquids according to Example 1.

Preparation of anion active resin "A":

| | Parts |
|---|---|
| Tetraethylene pentamine (1.1 mols) | 203 |
| Epichlorohydrin (3.2 mols) | 297 |
| Water | 500 |

The tetraethylene pentamine is charged into a suitable reaction vessel provided with an agitator and a means for cooling the vessel. The water is added to the tetraethylene pentamine, the resulting solution is cooled to about 44°–47° C., and the epichlorohydrin is added slowly while the reacting mixture is being continuously agitated and kept at a temperature between 44°–47° C. After all the epichlorohydrin has been added the resulting syrup is maintained at a temperature of about 50° C. for about 8 hours.

The gelled syrup is then heated or cured at a temperature of about 95°–105° C. for 17–18 hours. The cured resin is ground and screened and the 20–40 mesh material set aside for use in the resinous mixtures of the present invention.

The present invention is not limited to the addition of any particular quantity of magnetic substance to the resin. While I prefer to use about 15% by weight based on the final cured resin of the magnetic substance, equally satisfactory results may be obtained within a range of about 2% to about 40% magnetic material, depending upon the strength of the magnetic field that is to be employed for separation, the fineness of the magnetic medium, the density of resin that is desired, etc. In general, the amount of magnetic material incorporated with the resin must be sufficient to render substantially every particle of resin susceptible to recovery by magnetic means.

Other finely ground magnetic substances than magnetite may be used in the present invention. The magnetic substances so used should be relatively insoluble in the resin syrup into which they are incorporated and generally, their solubility in the syrup should not exceed about 10%. Some examples of suitable substances are ferrosilicon, magnetic iron oxide obtained from the production of aniline by reduction of nitrobenzene in the presence of iron, steel grit, roll scale, cobalt, nickel, alloys of cobalt and nickel and particularly their ferrous alloys, etc.

The magnetic substance, preferably ground to at least about minus 200 mesh in particle size, may be incorporated during the preparation of the resin as described in Examples 2, 3, 4 and 5 or, if desired, it may be bonded to resin particles by means of a binding agent as described in Example 7. Binding agents other than sodium silicate including the alkali metal silicates in general and certain carbonaceous binders are also suitable for use in accordance with the process of the present invention.

In general, I prefer incorporating the finely ground magnetic substance with the resin syrup during preparation of the resin if the reaction mixture is alkaline or weakly acid. If the reaction mixture is strongly acid, however, better results are usually obtained if the magnetic substance is bound to the cured or uncured resin particles by means of a suitable binder. It should be understood, however, that the present invention is not limited to either method of preparation of the magnetic ion active resin.

The present invention is not limited in any sense to a particular method of separation of the magnetic resin particles from the non-magnetic resin particles. On a small scale this may even be done with a hand magnet. In general commercial applications, however, it will be advantageous to utilize continuous magnetic separators such as, for example, the Crockett and Steffensen types.

The present invention is applicable to any ion exchange resin, cation or anion active. For example, the cation active resin may be a furfural-mineral acid halide condensation product as described in the copending application of James R. Dudley, Serial No. 528,768 filed March 30, 1944, now Patent No. 2,408,615, a sulfonated or phosphonated resinified furfural as described in the copending application of Jack T. Thurston, Serial No. 652,235 filed March 5, 1946 now Patent No. 2,525,247, an aldehyde condensation product of a sulfonated hydroxy aromatic compound containing an activating group such as a ketone group as described in the copending application of Jack T. Thurston, Serial No. 541,480 filed June 21, 1944 now Patent No. 2,440,669, and the like. In addition, furfural or formaldehyde condensation products of the reaction product of acetone, furfural and sodium bisulfite as described in Patent No. 2,372,233, polyhydric phenol-aldehyde condensation products such as the catechol tannin-formaldehyde condensation products, aromatic sulfonic acid condensation products as described in Patent No. 2,204,539, carbonaceous substances, i. e., sulfated or sulfonated carbonaceous materials such as coal, peat, lignite, etc., may also be used.

The cation active resins may be hydrogen activated or, if softening is desired rather than complete demineralization, they may be used on a sodium cycle. If the cation active materials are to operate on the hydrogen cycle, the resin may be activated by treating the resins with acid solutions, e. g., 0.1%–10% of hydrochloric acid, sulfuric acid, etc. If the cation active materials are to be operated on the sodium cycle, they should be activated by treating with a salt solution such as an aqueous solution of sodium chloride.

Anion active resins which may be rendered magnetic and then separated from mixtures with non-magnetic resins include condensation products of acetaldehyde, formaldehyde, and polyalkylene polyamines (copending application of Jack T. Thurston, Serial No. 643,836 filed January 26, 1946 now abandoned), condensation products of polyalkylene polyamines with acrylonitrileammonocarbonic acid adducts (copending application of James R. Dudley, Serial No. 651,375, filed March 1, 1946 now U. S. Patent 2,473,498), condensation products of aminotriazines, guanido compounds and aldehydes (copending application of James R. Dudley, Serial No. 607,277 filed July 26, 1945 now abandoned), condensation products of aminotriazines, aldehydes and strongly basic non-aromatic amines (copending application of James R. Dudley, Serial No. 649,127 filed February 20, 1946 now Patent No. 2,529,142), biguanide-aldehyde condensation products insolubilized by urea- or aminotriazine-formaldehyde condensation products as described in the Swain Patent No. 2,251,234, crotonaldehyde, formaldehyde and polyalkylene polyamine condensation products (copending application of James R. Dudley, Serial No. 643,838 filed January 26, 1946 now abandoned), condensation products of polyepoxy compounds and polyamines (copending application of James R. Dudley, Serial No. 655,005 filed March 16, 1946 now Patent No. 2,469,684), aldehyde condensation products of furyl aliphatic amines (copending application of James R. Dudley, Serial No. 642,416 filed January 19, 1946 now U. S. Patent 2,525,480), condensation products of glycerol dichlorhydrin and alkylene polyamines (copending application of Lennart A. Lundberg, Serial No. 624,606 filed October 25, 1945 now Patent No. 2,469,693), insolubilized guanyl urea-aldehyde and phenyl biguanide-aldehyde condensation products (copending applications of Robert C. Swain, Serial Nos. 368,105 filed November 30, 1940 now abandoned and 443,939 filed May 21, 1942, now abandoned, respectively), condensation products of polyacrylic acid with polyamines (copending application of James R. Dudley, Serial No. 648,818 filed February 19, 1946 now Patent No. 2,582,194), insolubilized polyamine-aldehyde condensation products (copending applications of James R. Dudley, Serial Nos. 442,281 and 442,282 filed May 8, 1942 both now abandoned, and Serial No. 633,859 filed December 8, 1945 now Patent No. 2,521,664), etc.

The anion exchange resin employed must, of course, be activated and this may be done in the conventional manner by treatment with a dilute alkaline substance such as, e. g., a 0.1%–10% solution of sodium hydroxide, sodium carbonate, a corresponding potassium salt, etc.

The present invention is particularly advantageous when applied to the separation by magnetic means of a single magnetic resin from a plurality of non-magnetic resins in admixture therewith.

Various combinations of separation processes may be utilized. For example, the mixture of ion exchange resins used in a liquid demineralization process may be separated from the demineralized liquid by means of froth flotation. The resinous components of the mixture may then be separated, one from the other, by means of a "sink and float" procedure or, according to the process of the present invention, by magnetic means providing, of course, that one of the resinous components has been made magnetic before its use. Obviously, any desired combination of various separation procedures may be used.

It is also possible to so adjust the density of a particular resin by means of the magnetic substance used to render it magnetic that after bulk magnetic recovery of a mixture of magnetic resins from a liquid medium, the more dense resin may be separated by "sink and float" techniques from the less dense resin.

The term "ionizable solids" or "ionizable materials" is intended to include both volatile and non-volatile materials. The major proportion of these solids are inorganic, but some organic substances may be included. These ionizable solids are impurities in the sense that they are not desired in admixture in the fluid to be purified but they may in themselves be valuable or desirable materials.

I claim:

1. A process which comprises bringing a liquid containing ionizable solids into contact with a mixture of a magnetic cation exchange resin and an anion exchange resin until the mixture of resins no longer has a capacity for removing ionizable solids from the liquid, removing the mixture of exhausted resins from said liquid, and separating the cation exchange resin from the anion exchange resin by magnetic means.

2. A process which comprises bringing a liquid containing ionizable solids into contact with a mixture of a magnetic cation exchange resin and an anion exchange resin until the mixture of resins no longer has a capacity for removing ionizable solids from the liquid, separating the mixture of exhausted resins from said liquid, and separating the cation exchange resin from the anion exchange resin by magnetic means, bringing the separated magnetic cation exchange resin into contact with a dilute solution of an acid, bringing the separated anion exchange resin into contact with a dilute solution of an alkali, mixing the so-reactivated cation and anion exchange resins together and bringing a liquid containing ionizable solids into contact with the mixture.

3. A process which comprises bringing a liquid containing ionizable solids into contact with a mixture of a magnetic ion exchange resin and a non-magnetic ion exchange resin, the two resins having opposite polarity, until the mixture of resins no longer has a capacity for removing ionizable solids from the liquid, removing the mixture of exhausted resins from the said liquid, and separating the magnetic ion exchange resin from the non-magnetic ion exchange resin by magnetic means.

EARL C. HERKENHOFF.

References Cited in the file of this patent

UNITED STATES PATENTS

| Number | Name | Date |
|---|---|---|
| 861,782 | Wait | July 30, 1907 |
| 1,494,070 | MacKnight | May 13, 1924 |
| 1,682,364 | Ballantine et al. | Aug. 28, 1928 |
| 1,683,780 | Hulsmeyer | Sept. 11, 1928 |
| 1,982,689 | Polydoroff | Dec. 4, 1934 |
| 2,197,931 | Jacobs | Apr. 23, 1940 |
| 2,198,378 | Ellis | Apr. 23, 1940 |
| 2,275,210 | Urbain | Mar. 3, 1942 |
| 2,352,324 | Hubler | June 27, 1944 |
| 2,365,720 | Neighbors | Dec. 26, 1944 |
| 2,412,668 | Bandur | Dec. 17, 1946 |
| 2,434,190 | Barnes | Jan. 6, 1948 |
| 2,461,505 | Daniel | Feb. 15, 1949 |

OTHER REFERENCES

Akeroyd: Journ. Physical Chemistry, vol. 42, 1938, pp. 343–352.

McCulloch: Disinfection and Sterilization, 1945, Lea and Febiger, Philadelphia, p. 263.

A. P. C. application of Pieter Smit, Ser. No. 359,575, published May 11, 1943.